(12) United States Patent
Li et al.

(10) Patent No.: US 8,397,053 B2
(45) Date of Patent: Mar. 12, 2013

(54) MULTI-MOTHERBOARD SERVER SYSTEM

(75) Inventors: Cheng-Wei Li, Shanghai (CN); Xiong-Jie Yu, Shanghai (CN); Tsu-Cheng Lin, Taipei (TW)

(73) Assignee: Inventec Corporation, Taipei (TW)

( * ) Notice: Subject to any disclaimer, the term of this patent is extended or adjusted under 35 U.S.C. 154(b) by 532 days.

(21) Appl. No.: 12/699,046

(22) Filed: Feb. 3, 2010

(65) Prior Publication Data

US 2011/0191573 A1    Aug. 4, 2011

(51) Int. Cl.
- *G06F 9/00* (2006.01)
- *G06F 9/24* (2006.01)
- *G06F 15/177* (2006.01)
- *G06F 13/00* (2006.01)
- *G06F 13/14* (2006.01)

(52) U.S. Cl. ............... 713/2; 713/1; 713/100; 710/100; 710/305

(58) Field of Classification Search .................. None
See application file for complete search history.

(56) References Cited

U.S. PATENT DOCUMENTS

| | | | |
|---|---|---|---|
| 7,069,349 B2* | 6/2006 | Hawkins et al. | 710/15 |
| 8,200,800 B2* | 6/2012 | Bolan et al. | 709/223 |
| 2006/0236155 A1* | 10/2006 | Lee et al. | 714/31 |
| 2007/0094426 A1* | 4/2007 | Chiang et al. | 710/73 |
| 2008/0303692 A1* | 12/2008 | Hirai | 340/825.52 |
| 2011/0119410 A1* | 5/2011 | Chen et al. | 710/19 |
| 2012/0117394 A1* | 5/2012 | Lu et al. | 713/310 |

* cited by examiner

*Primary Examiner* — Ji H Bae
(74) *Attorney, Agent, or Firm* — CKC & Partners Co., Ltd.

(57) ABSTRACT

A multi-motherboard server system, having a management board and a plurality of motherboards, is disclosed. The multi-motherboard server system is applicable to a sever system. The management board has a BMC, and the motherboards are respectively connected to the management board. The BMC can transmit data to a far-end control system through sideband communication.

11 Claims, 2 Drawing Sheets

MULTI-MOTHERBOARD SERVER SYSTEM

BACKGROUND

1. Field of Invention

The present invention relates to a baseboard management controller (BMC) of a server, and more particularly, to a network interface system of a BMC.

2. Description of Related Art

In a conventional multi-motherboard server system, each of the motherboards has a baseboard management controller (BMC) disposed thereon. A conventional server system uses a BMC disposed on each motherboard to manage and control its motherboard, and the operations among the motherboards are controlled integratedly by the BMCs. Since each motherboard has one BMC installed thereon, the manufacturing cost of the multi-motherboard server system is increased.

Hence, it is an urgent problem desired to be solved to save additional cost caused by installing one BMC on each of the motherboards.

SUMMARY

In view of the forgoing, the present invention provides multi-motherboard server system applied in a server system, and the multi-motherboard server system includes a management board and a plurality of motherboards. The management board has a baseboard management controller (BMC). The motherboards are respectively connected to the management board. Each of the motherboards includes a south bridge chip, a peripheral interface controller (PIC), and a network interface controller (NIC), wherein the PIC is electrically connected to the south bridge chip and the BMC and records the working status message of the motherboard. The NIC is adapted for connection to a network and a far-end control system. The far-end control system is used to communicate with the BMC, wherein the NIC is electrically connected to the south bridge chip to connect the motherboard to the network. The NIC is further electrically connected to the BMC through a serial bus interface, so that when the far-end control system communicates with the BMC, the communication between the far-end control system and the BMC is conducted through the NIC and the serial bus interface.

Further, the PIC records the working status message of the motherboard, and the BMC identifies the motherboards through the PIC and obtains the working status messages of the motherboards on which the PIC locate, thereby monitoring the statuses of the motherboards. The BMC communicates with the far-end control system through the NIC and the serial bus interface of one of the motherboards.

Therefore, the far-end control system can use the multi-motherboard server system of the present invention to turn on or turn off the motherboards through a sideband communication mode, or update the basic input/output systems (BIOS) of one or more motherboards.

It is to be understood that both the foregoing general description and the following detailed description are examples, and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Figure 1:
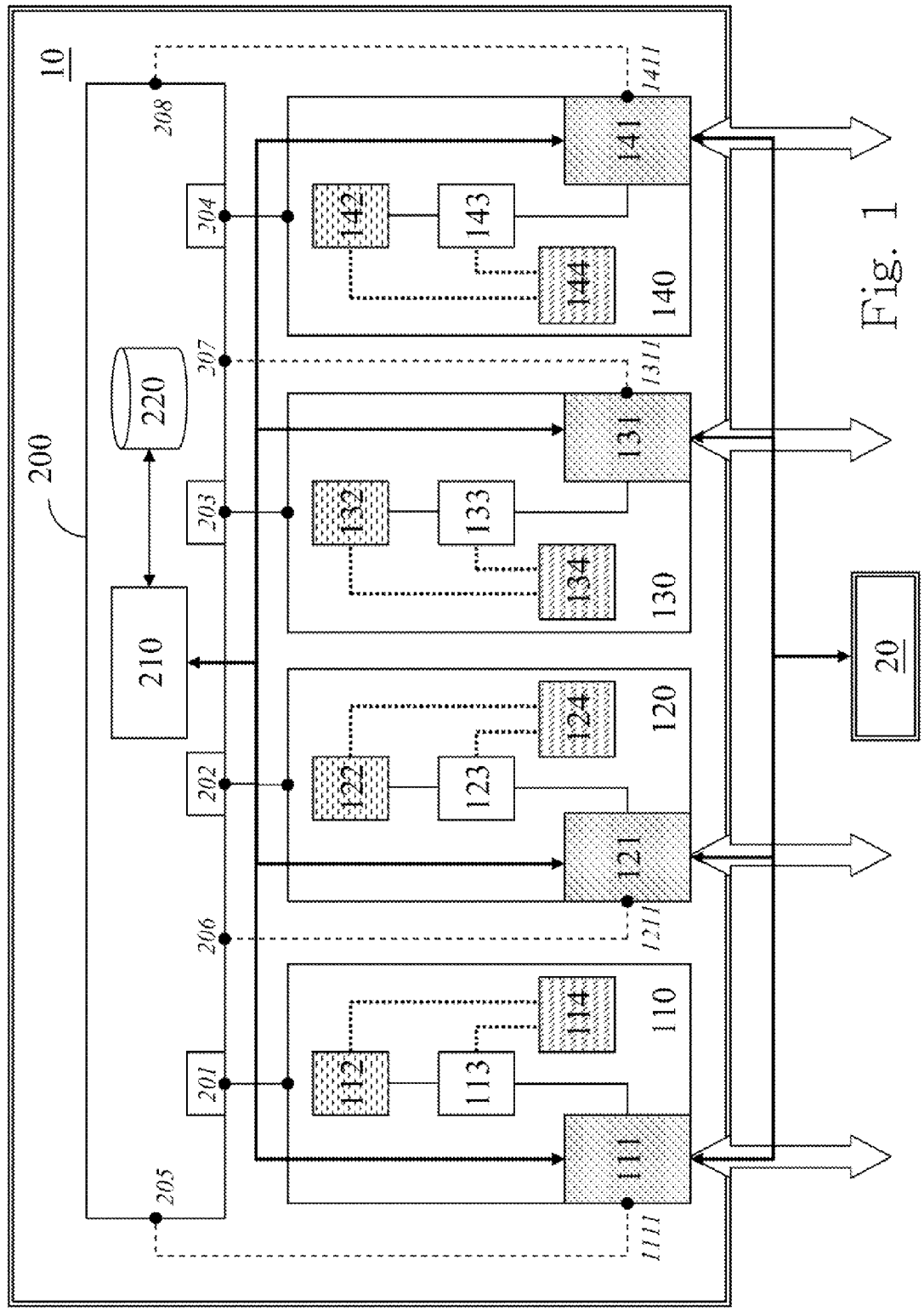
FIG. 1 is a block diagram showing a multi-motherboard server system in accordance with an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Referring to FIG. 1, FIG. 1 is a block diagram showing a multi-motherboard server system in accordance with an embodiment of the present invention. The multi-motherboard server system of this embodiment is disposed in a server system 10. The multi-motherboard server system includes management board 200, and motherboards 110-140. The management board 200 has a baseboard management controller (BMC) 210. The motherboards 110-140 are electrically connected to the management board 200 respectively to execute the data processing of the server system 10. The motherboards 110-140 respectively include network interface controllers (NIC) 111-141, peripheral interface controllers (PIC) 112-142, south bridge chips 113-143, and basic input/output systems (BIOS) 114-144.

The NIC 111-141 are adapted for connecting to a network and a far-end control system 20, and the far-end control system 20 is used to communicate with the BMC 210, wherein the NIC 111-141 are electrically connected to the south bridge chips 113-143 respectively to connect the motherboards 110-140 to the network. The NIC 111-141 are further connected to the BMC 210 through serial bus interface. When the far-end control system 20 communicates with the BMC 210, the communication between the far-end control system 20 and the BMC 210 is conducted through the NIC 111-141 and the serial bus interfaces.

The PIC 112-142 are disposed on the motherboards 110-140 respectively and record the working status messages of their motherboards 110-140 respectively. The BMC 210 identifies the motherboards 110-140 through the PIC 112-142 and obtains the working status messages of the motherboards 110-140 recorded by the PIC 112-142, so as to monitor the working statuses of the motherboards 110-140. The BMC 210 communicates with the far-end control system 20 through the NIC and the serial bus interface of one of the motherboards 110-140. The communication between the BMC 210 and each of the PIC 112-142 is conducted through an intelligent platform management bus (IPMB) protocol.

Since the motherboards 110-140 have the same elements, only the motherboard 110 is used as an example for briefly explaining the elements thereof hereinafter. However, such example is not used to limit the elements composing the motherboards 110-140. In the example of the motherboard 110, the NIC 111 is electrically connected to the south bridge chip 113 and is controlled thereby for performing data transmission between the motherboard 110 and the far-end control system 20 external to the server system 10. The PIC 112 is electrically connected to the NIC 111 through the south bridge chip 113 and to the BMC 210, so as to receive the instructions issued by the BMC 210 and transmit data to the BMC 210. The BIOS 114 is electrically connected to the south bridge chip 113 through a first serial bus interface and to the PIC 112 through a second serial bus interface. The above-mentioned PIC is a complex programmable logic device (CPLD) or a programmable Integrated Circuit.

The BMC 210 is capable of driving the NIC 111-141 through the serial bus interfaces. When the NIC 111-141 are driven by the BMC 210, the far-end control system 20 can be electrically connected to the NIC 111-114 of the motherboards 110-140. The communication between the far-end control system 20 and the BMC 210 is conducted through the NIC 111-114 and the serial bus interfaces of the motherboards 110-140. Therefore, the BMC 210 can be connected to the far-end control system 20 through one of the NIC 111-114 and transmits data to the far-end control system external to the server system.

When the BMC 210 receives an instruction issued by the far-end control system 20 through the NIC 111 for obtaining the working status messages of the motherboards 110-140, the BMC 210 obtains the working status messages of the motherboards 110-140 from the PIC 112-142 of the motherboards boards 110-140 on their motherboards are disposed and transmits the working status messages of the motherboards 110-140 to the far-end control system 20 through the serial bus interface and the NIC 111 of the motherboard 110. It is realized to use one of the motherboards 110-140 to get the working status message of each of the motherboards of the server system 10. Because the function of each of the motherboards is the same with the function of each other, the far-end control system can be connected to the server system 10 through one of the motherboards.

The BIOS 114-144 of the motherboards 110-140 are respectively electrically connected to the south bridge chips 113-143 and the PIC 112-142. When the BMC 210 receives an update instruction issued by the far-end control system 20 for updating the BIOS 114-144 of the motherboards 110-140, the BMC 210 can receive an update data through one of the NIC 111-141. Then, the BMC 210 controls the PIC 112-142 of the motherboards 110-140 to update the BIOS 114-144 of the motherboards 110-140. The BMC 210 performs one or more updating operations on one or more of the BIOS 114-144 on the motherboards 110-140 in accordance with the instruction issued by the far-end control system 20.

The management board 200 further includes a storage 220 electrically connected to the BIOS 111-114. When the BMC 210 receives an update instruction and update data issued by the far-end control system 20 through one of the motherboards 110-140 for updating the BIOS 114-144, the BMC 210 first stores the update data in the storage 220, and then the BMC 210 controls the PIC 112-142 to read the update data stored in the storage 220 and performs one or more updating operations on one or all of the BIOS 114-144. Because of the presence of the storage 220, the updating operations of the BIOS can be completed by transmitting the update data only one time, thereby saving much network resource and speeding up the update of the BIOS.

The BMC 210 further includes a plurality of general purpose input/output (GPIO) pins respectively connected to the motherboards 110-140. When the BMC 210 receives an instruction issued by the far-end control system 20 through the NIC and the serial bus interface of one of the motherboards 110-140 for turning on or off a target motherboard of the motherboards, the BMC 210 transmits a power-on signal or a power-off signal to the target motherboard through the GPIO pin connected to the target motherboard to turn on or off the target motherboard. As shown in FIG. 1 the BMC 210 transmits a power-on signal or a power-off signal to the motherboard 110 through the GPIO pin 201 to remote control the on/off statues of the motherboard 110.

In addition, the BMC 210 further includes GPIO pins 205-208. The NIC 111-141 respectively has pins 1111-1411 connecting to the GPIO pins 205-208 of the BMC 210 in a one to one manner. Through the GPIO pins 205-208, the BMC 210 is notified to receive the information from the NIC 111-141.

Figure 2:
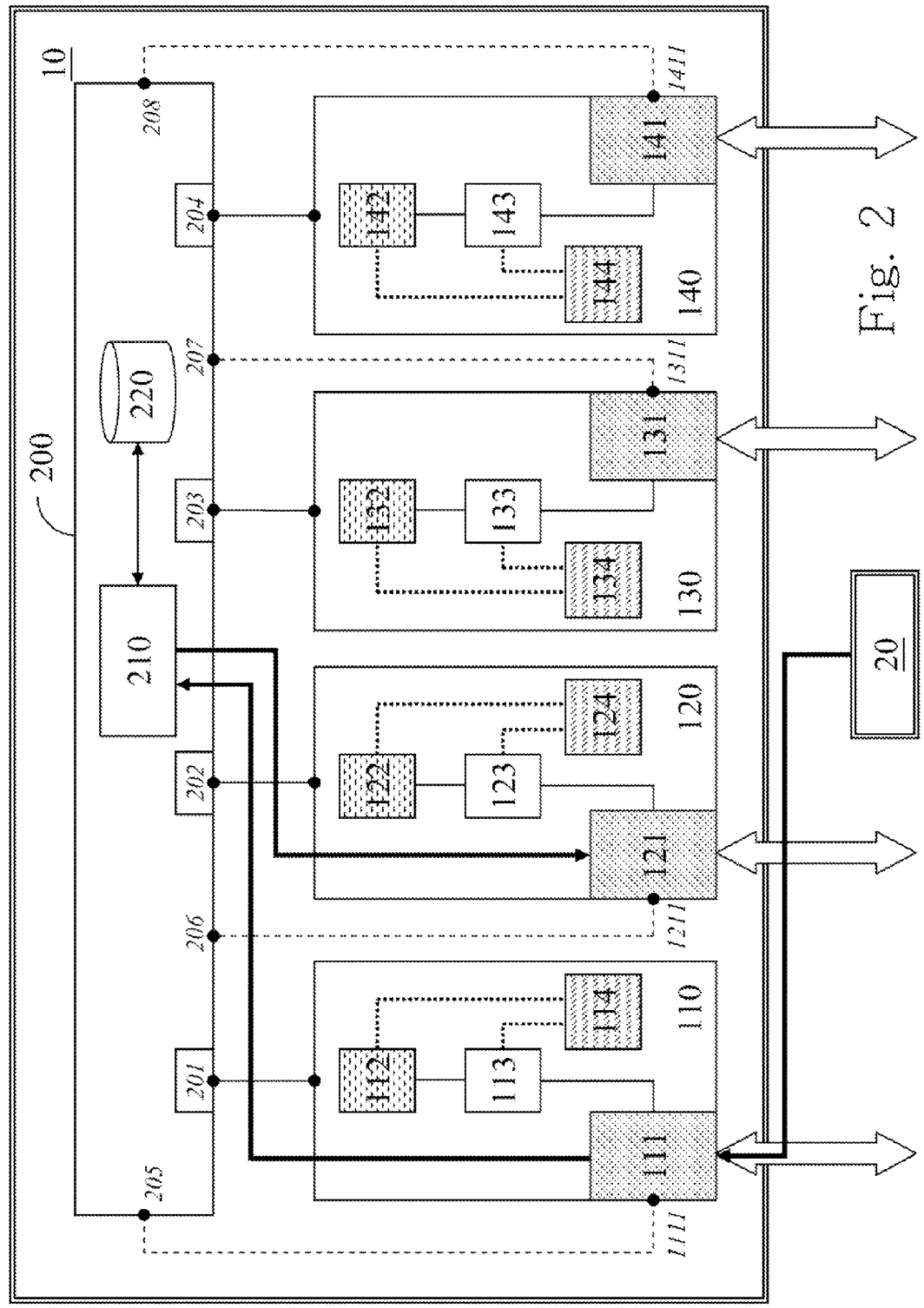
FIG. 2 is a block diagram showing how to use the multi-motherboard server system of the present invention to update the motherboards.

Referring to FIG. 2, FIG. 2 is a block diagram showing how to use the multi-motherboard server system of the present invention to update the motherboards. In FIG. 2, the NIC 111 of the motherboard 110 first receives the update data transmitted from the far-end control system 20, and then the BMC 210 updates the BIOS 124 of the motherboard 120, wherein it is merely used as an example to explain the updating of the motherboard 120, but not used to limit the way to update the other motherboards in the present invention.

The BMC 210 of the present invention is capable of identifying the motherboards 110-140 through the PIC 112-142, and communicates with the far-end system 20 through the NIC and the serial bus interface of one of the motherboards 110-140. Therefore, the BMC 210 is capable of communicating with the far-end control system 20 through the NIC 111.

Further, the BIOS 114-144 of the motherboards 110-140 are electrically connected to the BMC 210 through the PIC 112-142. Therefore, when the BMC 210 receives an update instruction issued by the far-end control system 20 for updating the BIOS 124, the BMC 120 receives an update data through the motherboard 110. Then, the BMC 210 controls the PIC 122 of the motherboard 120 in accordance with the update instruction to update the BIOS 124. In addition, the NIC 111-141 of the motherboards 110-140 communicates with the BMC 210 through a bus, such as I2C bus.

Therefore, the far-end control system 20 can use the multi-motherboard server system of the present invention to turn on or turn off the motherboards through a sideband communication mode, or update the BIOS of one or more motherboards.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A multi-motherboard server system, set up in a server system, wherein the multi-motherboard server system comprises:

a management board having a BMC;

a plurality of motherboards respectively connected to the management board, wherein each of the motherboards comprises:

a south bridge chip;

a PIC electrically connected to the south bridge chip and the BMC, wherein the PIC records a working status message of its own motherboard; and a NIC adapted for connecting to a network and a far-end control system used to communicate with the BMC, wherein the NIC is electrically connected to the south bridge chip to connect the motherboard to the network, and the NIC is further electrically connected to the BMC through a serial bus interface, and when the far-end control system communicates with the BMC, the communication between the far-end control system and the BMC is conducted through the NIC and the serial bus interface;

wherein the working status messages of the motherboards are recorded by their own PICs respectively, and the BMC identifies the motherboards through the PICs and obtains the working status messages of the motherboards on which the PICs are located, thereby monitoring the statuses of the motherboards, and the BMC communicates with the far-end control system through the NIC and the serial bus interface of one of the motherboards.

2. The multi-motherboard server system as claimed in claim 1, wherein the motherboards comprise a first motherboard and at least one second motherboard, and the far-end control system is electrically connected to the NIC of the first motherboard, and the communication between the far-end control system and the BMC is conducted through the NIC and the serial bus interface of the first motherboard.

3. The multi-motherboard server system as claimed in claim 2, wherein the BMC obtains the working status message of the first motherboard from the PIC of the first motherboard and transmits the working status message of the first motherboard to the far-end control system through the serial bus interface and the NIC of the first motherboard, when the BMC receives an instruction issued by the far-end control system for obtaining the working status message of the first motherboard.

4. The multi-motherboard server system as claimed in claim 2, wherein the BMC obtains the working status message of the second motherboard from the PIC of the second motherboard and transmits the working status message of the second motherboard to the far-end control system through the serial bus interface and the NIC of the first motherboard, when the BMC receives an instruction issued by the far-end control system for obtaining the working status message of the second motherboard.

5. The multi-motherboard server system as claimed in claim 2, wherein the first motherboard further comprises a BIOS electrically connected to the south bridge chip and the PIC of the first motherboard, and when the BMC receives an update instruction issued by the far-end control system for updating the BIOS, the BMC receives an update data through the first motherboard and controls the PIC of the first motherboard to update the BIOS.

6. The multi-motherboard server system as claimed in claim 2, wherein the second motherboard further comprises a BIOS electrically connected to the south bridge chip and the PIC of the second motherboard, and when the BMC receives an update instruction issued by the far-end control system for updating the BIOS, the BMC receives an update data through the first motherboard and controls the PIC of the second motherboard to update the BIOS.

7. The multi-motherboard server system as claimed in claim 1, wherein each of the motherboards comprises a BIOS electrically connected to the south bridge chip and the PIC of the motherboard, and the management board further comprises a storage electrically connected to the BIOS, and when the BMC receives an update instruction and update data issued by the far-end control system through one of the motherboards for updating the BIOS, the BMC stores the update data in the storage, and controls the PIC to read the update data stored in the storage to update the BIOS.

8. The multi-motherboard server system as claimed in claim 1, wherein the BMC further comprises a plurality of GPIO pins respectively connected to the motherboards, and when the BMC receives an instruction issued by the far-end control system through the NIC and the serial bus interface of one of the motherboards for turning on or off a target motherboard of the motherboards, the BMC transmits a power-on signal or a power-off signal to the target motherboard through the GPIO pin connected to the target motherboard to turn on or off the target motherboard.

9. The multi-motherboard server system as claimed in claim 8, wherein each of the NICs comprises a pin, connecting to GPIO pins of the BMC, and through the GPIO pins, the BMC is notified to receive information from the NICs.

10. The multi-motherboard server system as claimed in claim 1, wherein the far-end control system updates the BMC through one of the NICs.

11. The multi-motherboard server system as claimed in claim 7, wherein the BIOS of one of the motherboards is connected to the network through the south bridge chip for performing updating.

* * * * *